United States Patent
Bachmeier

(10) Patent No.: US 6,793,947 B2
(45) Date of Patent: Sep. 21, 2004

(54) FEED SUPPLEMENT AND METHODS OF MAKING THEREOF

(75) Inventor: Gerald M. Bachmeier, Morris, MN (US)

(73) Assignee: Denco Producers Association, LLC, Morris, MN (US)

( * ) Notice: Subject to any disclaimer, the term of this patent is extended or adjusted under 35 U.S.C. 154(b) by 350 days.

(21) Appl. No.: 09/998,906

(22) Filed: Nov. 30, 2001

(65) Prior Publication Data

US 2003/0104112 A1 Jun. 5, 2003

(51) Int. Cl.$^7$ .............................. A23K 1/00; A23K 1/16
(52) U.S. Cl. ...................... 426/74; 426/623; 426/630; 426/635; 426/656; 426/658; 426/807
(58) Field of Search ................... 426/74, 623, 630, 426/635, 656, 658, 807

(56) References Cited

U.S. PATENT DOCUMENTS

| | | | |
|---|---|---|---|
| 4,005,192 A | 1/1977 | Graham et al. ............. 424/157 |
| 4,265,916 A * | 5/1981 | Skoch et al. ................... 426/74 |
| 4,333,956 A | 6/1982 | Juengst, Jr. et al. .......... 426/69 |
| 4,349,578 A * | 9/1982 | Wright et al. ............... 426/630 |
| 4,431,675 A | 2/1984 | Schroeder et al. ............ 426/69 |
| 4,729,896 A | 3/1988 | Sawhill ........................ 426/2 |
| 4,735,809 A | 4/1988 | Donovan et al. ............. 426/69 |
| 4,851,244 A * | 7/1989 | Theuninck et al. ........... 426/74 |
| 4,904,486 A | 2/1990 | Donovan et al. ............. 426/69 |
| 5,177,009 A | 1/1993 | Kampen ..................... 435/139 |
| 5,260,089 A | 11/1993 | Thornberg .................. 426/624 |
| 5,264,227 A | 11/1993 | Laroche et al. ............... 426/72 |
| 6,143,335 A | 11/2000 | McKenzie ................... 426/72 |
| 6,168,803 B1 | 1/2001 | Harris et al. ................. 424/442 |
| 6,440,478 B1 | 8/2002 | Benton et al. .............. 426/471 |

* cited by examiner

Primary Examiner—C. Sayala
(74) Attorney, Agent, or Firm—IPLM Group, P.A.

(57) ABSTRACT

Improved compositions and processes for making a livestock feed supplement including compressing a mixture of materials that has wet cake into a feedblock for a livestock animal. Advantages of the compositions and processes are an increase in efficiency and a savings of energy, including the use of less syrup.

14 Claims, 2 Drawing Sheets

FEED SUPPLEMENT AND METHODS OF MAKING THEREOF

FIELD OF THE INVENTION

The invention is related to the field of food or edible material processes, compositions and products. The invention is more particularly related to animal food prepared using distiller's or brewer's residue.

BACKGROUND

Feedblocks are animal feed supplements for livestock. They are dry or moist blocks of concentrated food that farmers give to their grazing animals. Feedblocks provide cost-effective nutritious food that supplements animal grazing. Protein, minerals, and calories are typically available in feedblocks to help livestock grow and remain healthy. A feedblock is soft enough for an animal to eat but hard enough so that it is not eaten too quickly. A useful source of food for feedblocks is the remnants of grain that has been used to make alcohol, e.g., distiller's or brewer's residue.

A conventional process for making feed blocks is shown in FIG. 1. Whole corn is milled and combined with water in a slurry tank. The mixture is processed in a jet cooker, treated with enzymes in a liquefaction vessel, cooled, and fermented with yeast and enzymes in a fermentation vessel. The mixture is treated in a column distillation center to remove ethanol. A centrifuge is used to separate the remaining material into two portions, one that is predominantly water (called thin stillage) and one that is predominantly solids (called wet cake, wet grains, and wet distiller's grain). The stillage has some of its water removed in an evaporator to make syrup (also called condensed distillers solubles, CDS).

A conventional process dries the wet cake in a drier that is typically a drum or rotary dryer. The dryer removes the water from the wet cake and converts it into another product called distillers dried grains (DDG). The DDG is recombined with water, syrup, and other materials to make a feedblock.

The step of drying the wet cake drives off moisture and produces emissions that requires the use of scrubbers and various emission control devices. Despite the emissions control devices, the wet cake drying process typically produces odors that many people find to be unpleasant. The drier used for the drying step is typically large and expensive to purchase and operate because it requires heat that must be generated by burning fuel or consuming other energy. The step of making syrup consumes energy because it requires the use of an energy-consuming evaporator.

SUMMARY OF THE INVENTION

The present invention provides methods for producing a high quality feedblock from wet cake so that the step of drying the wet cake is substantially reduced or essentially eliminated. The methods of the invention save substantial costs and improve efficiency of the feedblock production process. The methods of the invention also utilize less syrup than conventional processes.

An embodiment of the invention includes a process for making a livestock feed supplement by compressing a mixture of materials that comprises wet cake into a feedblock that is consumable by a livestock animal. In another embodiment of the invention, the method further comprises a step of making the mixture with a water concentration from about 15% to about 50% by weight preparatory to compression, and more preferably from about 25% to about 40%. In a related embodiment of the invention, a feedblock is made by the process of using wet cake.

An embodiment of the invention includes a process for making a livestock feed supplement by making a mixture of materials that comprises wet cake, with the mixture being between about 20% to about 60% wet cake by weight, preferably from about 25% to about 50% wet cake by weight, more preferably from about 30% to about 45% wet cake by weight, with the wet cake being from about 60% to about 75% water by weight.

An embodiment of the invention is a livestock animal feedblock having a mixture of materials that is consumable by a livestock animal with a crude protein content of at least about 10% and having from about 3% to about 25% syrup by weight, preferably from about 5% to about 20%, more preferably from about 5% to about 10% syrup by weight, with the syrup being from about 25% to about 35% solids. The feedblock mixture may further have from about 20% to about 60% wet cake by weight, preferably from about 25% to about 50% wet cake by weight, more preferably from about 30% to about 45% wet cake by weight, with the wet cake being from about 60% to about 75% water by weight. The feedblock may further have mineral supplements and have from about 10% to about 35% DDG by weight with the DDG being from about 10% to about 15% by water by weight.

An embodiment of the invention includes a livestock animal feedblock with a mixture of materials that is consumable by the livestock, in the form of a substantially solid block having from about 20% to about 60% wet cake by weight, preferably from about 25% to about 50% wet cake by weight, more preferably from about 30% to about 45% wet cake by weight, with the wet cake being from about 60% to about 75% water by weight. The feedblock mixture may further have from about 5% to about 10% syrup by weight, the syrup being from about 25% to 35% solids. The feedblock may further have mineral supplements and have from about 10% to about 35% DDG by weight, with the DDG being from about 10% to about 15% by water by weight.

While the invention is amenable to various modifications and alternative forms, specifics are provided by way of example in the specification. It should be understood, however, that the intention is not to limit the invention to the particular embodiments described. On the contrary, the invention is to cover all modifications, equivalents, and alternatives falling within the spirit and scope of the invention.

DETAILED DESCRIPTION

The present invention provides methods for producing a high quality feedblock from wet cake. The use of wet cake avoids expensive drying steps and avoids the potential loss of nutritive value that results from drying. Further, the invention provides for the use of less syrup than conventional methods resulting in a cost savings, e.g., decreasing the use of an evaporative step to reduce thin stillage to syrup.

Figure 1:
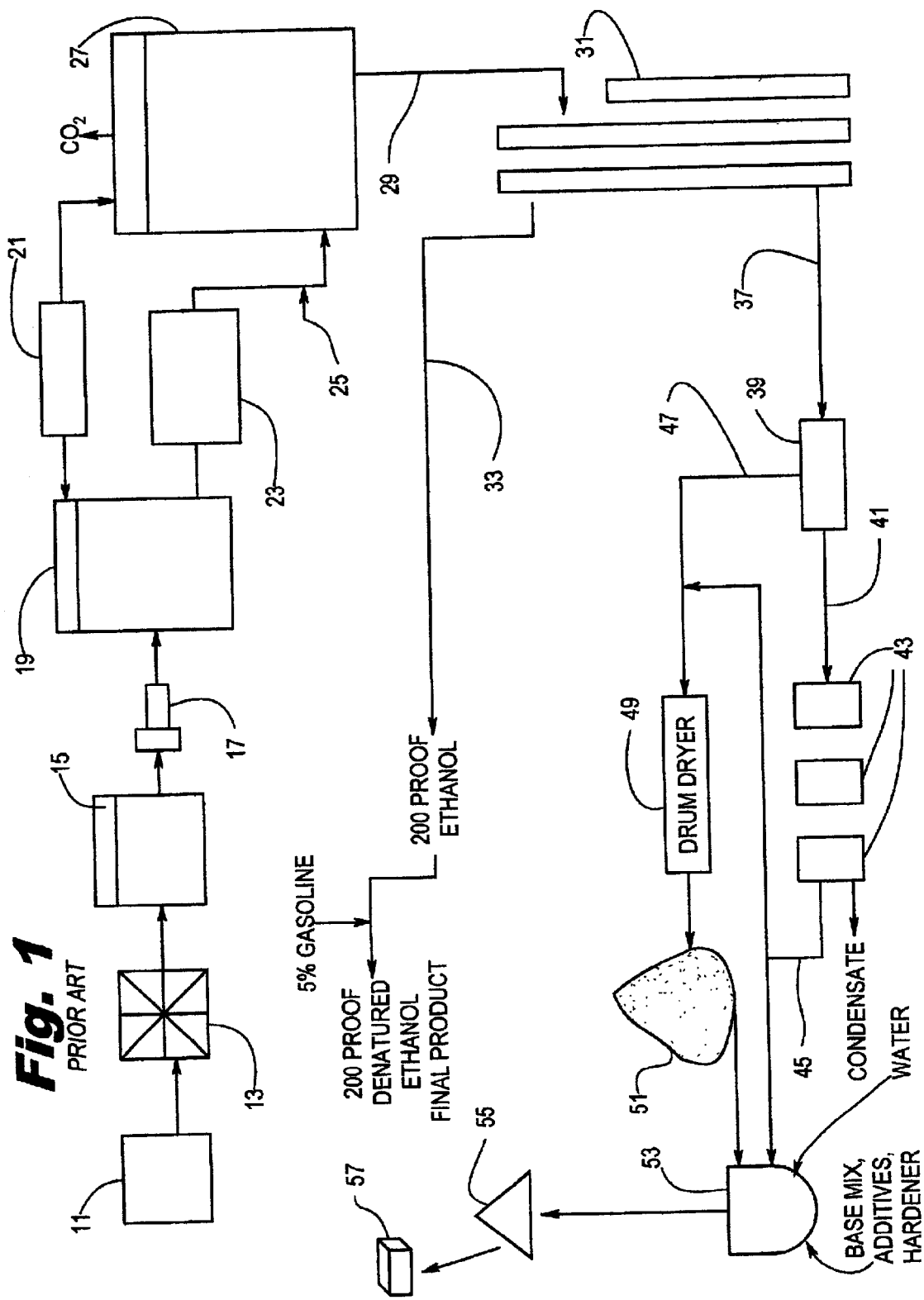
FIG. 1 depicts a conventional prior-art process for making feedblocks.

FIG. 1 depicts a conventional prior-art process for making feedblocks. Whole corn 11 is milled in hammer mill 13 to a fine flour and added with water and enzymes to make a slurry in slurry tank 15. The slurry is heated in jet cooker 17 and passed into liquefaction vessel 19 where enzymes 21 are added to assist in the enzymatic process of converting the corn starch into fermentable sugars. The slurry, also called mash, is passed through mash cooling device 23, combined with yeast 25, and passed into fermentation vessel 27 where fermentation takes place so that ethanol is produced and carbon dioxide is released. Alcohol-rich mixture 29, also called beer, is passed into three column distillation system 31. Ethanol 33 is removed from distillation system 31 and further processed to make ethanol, denatured ethanol, and ethanol-enriched gasoline. A mixture of liquids and solids termed whole stillage 37 is removed from the distillation system 31 and processed through centrifuge 39 to produce a liquid-rich fraction termed thin stillage 41 and a solids-rich fraction termed wet cake 47 or wet grain. Some of the thin stillage is pumped back to slurry tank 15 and the other portion is processed through evaporators 43 to remove liquids and produce syrup 45. Some of syrup 45 is combined with wet cake 47 in drier 49 where moisture is removed to produce DDG 51. DDG 51, syrup 45, and other additives such as base, water, hardener, and vitamins, are combined in feedblock mixer 53 and sent to press 55 for pressure-driven compression into feedblocks 57. Molasses is often added to help make the feedblocks cohesive. Magnesium oxide is used as a hardener to help make the feedblocks hard. The feedblocks are solid, meaning that they essentially maintain their shape when placed on a surface.

Figure 2:
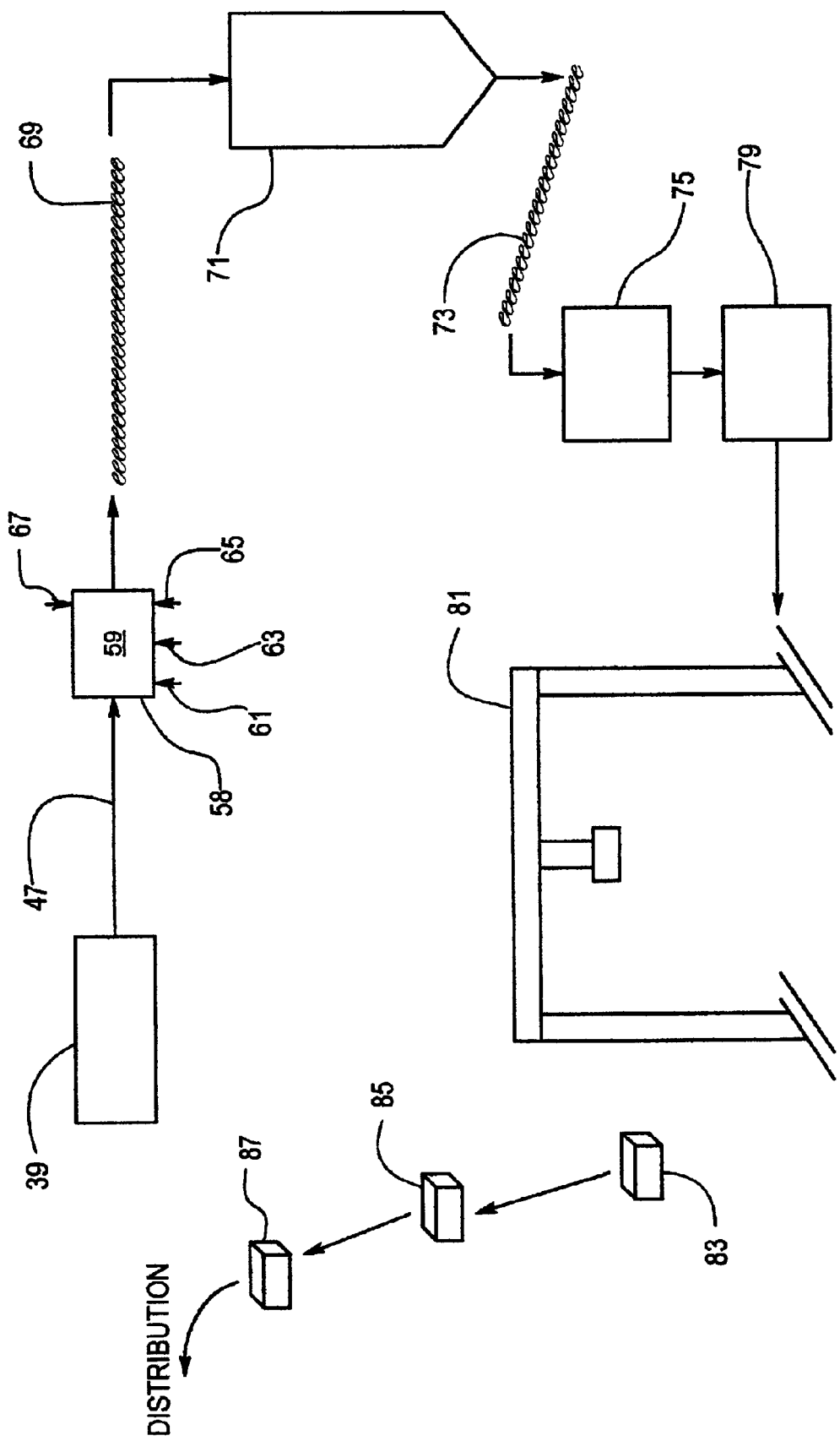
FIG. 2 depicts an embodiment that uses wet cake as a component of feedblocks

FIG. 2 depicts an embodiment of the invention, which is a simplified process for making feedblocks. Wet cake 47 is combined in mixer 58 with ingredients 59 that include minerals 61, hardener 63, solubles 65, and DDG 67. The mixture is conveyed on mixing conveyer 69 to surge hopper 71 that allows for continuous operation. Loading conveyer 73 transports the surge hopper contents to weigh hopper 75. The contents of weigh hopper 75 are loaded into a tub 79 that cooperates with press 81 to compress the contents into a feedblock 83. Feedblock 83 undergoes packaging 85 and a curing step 87 before being distributed. Feedblocks 83 are preferably cylinders about 20 inches in diameter and 18 inches thick. Press 81 is preferably a hydraulic press used to apply 1000 to 2000 psi of pressure. Packaging 85 is may be plastic, paper, or other materials known to those skilled in these arts.

Ingredients 59 may include consumable products, e.g., DDG 67, soybean meal, wheat products, corn products, natural grains, legumes, and other natural food products, solubles 65, e.g., in syrup, including solubles from grains, legumes, wheats, corns, vitamins, minerals 61, and hardeners 63, e.g., magnesium oxide, and calcium oxide. A soluble is a material that is removed from a solid and placed into a liquid. For example, a corn soluble is a material derived from corn that is dissolved or suspended in a liquid. Nutritional supplements, e.g., minerals and vitamins, are preferably premixed into the wet cake and/or syrup or with ingredients 59 so that they are thoroughly distributed through the final mixture. Ingredients 59, just prior to compression, are preferably from about 15% to about 20% by weight of a pre-mixed base of mineral supplements that does not have molasses or urea or bone meal, blood meal, or other such animal by-products; from about 30% to about 45% wet cake by weight that is from about 60%–75% by water by weight; from about 15% to 35% DDG by weight that is about 10%–15% water; and from about 5% to 10% syrup by weight, the syrup being from about 25% to 35% solids. The total moisture content of the mixture is adjusted to about 25% to about 40% water, more preferably from about 30–35% water, to give the resulting mixture a consistency that packs and hardens when compressed to form a feedblock. The feedblocks are preferably at least 12% protein and certain embodiments are free of molasses, urea, and/or animal by-products.

The compression step is performed in a press such as a hydraulic press. It is preferable to put the material to be compressed into a tub or dnum and apply a pressure of about 500 to about 2000 psi, preferably from about 1000 to about 1500 psi for about 5 to 80 seconds. A hardener is preferably added before compressing the mixture so that the blocks will achieve a hardness that those skilled in these arts have conventionally found to be suitable for feeding livestock. The hardener is believed to promote a chemical reaction that increases the hardness of the feedblocks.

The feedblocks are preferably 100–300 pounds, more preferably 150–250 pounds, and even more preferably about 180–220 pounds. The weight of the block is a function of the production process, the distribution process and the process of putting the feedblocks into the field, and affects the feeding habits of the livestock and other animals that feed on the blocks.

After the compression step the feedblock may be packaged and is preferably cured for at least one day, more preferably two to three days. The curing step allows excess moisture to evaporate, thereby creating a block that is readily movable and transportable. After the curing step, the block is made available for distribution.

Wet cake is a term that describes the solids-rich fraction of whole stillage that may be obtained by separating thin stillage from whole stillage. Whole stillage is a product of a distillation process that removes alcohol from fermented materials. Wet cake includes a solids-rich fraction taken from derivatives of whole stillage and from derivatives of the solids-rich fraction of whole stillage or a whole stillage derivative. For example, whole stillage or wet cake may be supplemented with other materials, e.g., water, syrup, aqueous solutions, solids, solutes, sugar, salt, vitamins, minerals, mineral oil, and supplements. For example, whole stillage or wet cake may have components removed, e.g., by sieving, partial drying, filtration, and centrifugation.

Wet cake is distinct from DDG because DDG has undergone extra processing steps, including extra drying steps. These extra processing steps may be advantageously avoided by using the present invention in using wet cake instead of DDG. It is further believed that DDG is chemically distinct from the solids portions of wet cake because the DDG has undergone extra drying steps that are likely to affect its chemical properties, including its nutritive value. Therefore, DDG that has been reconstituted in an aqueous solution is chemically distinct from wet cake.

Syrup, as used herein, means a product derived from thin stillage that has a solids content of about 20% to about 35% by weight, with the solids being both dissolved and suspended solids. Percentage concentrations set forth herein are weight/weight (w/w) unless otherwise stated. An advantage of the invention is that it allows for the use of less syrup compared to conventional processes.

Syrup is distinct from thin stillage because syrup has a greater solids content and has a different thermal history, i.e., it has been exposed to higher levels of heat that are believed to affect its chemical and physical properties. Syrup is distinct from DDG that has been mixed with water because syrup has a different mechanical and thermal processing history than DDG. For example, syrup has been exposed to different temperatures for different lengths of time as compared to DDG. Further, the solids/liquids separations process is believed to distribute solids differently between syrup and DDG, e.g., the number, size, shape, and chemical composition of solids are believed to be different. Therefore, mixtures of materials that include syrup are distinct from mixtures of materials that contain no syrup or different concentrations of syrup. The distribution of solids in a mixture can affect its physical and chemical properties, e.g., its hardness.

One embodiment of the invention involves combining both wet cake and DDG. The use of wet cake decreases the use of DDG so as to save money, energy, processing time, and reduce manufacturing emissions. DDG may optionally be combined with wet cake so as to adjust the amount of solids in the final mixture. Wet cake may be combined with a wide variety of livestock consumables to make feedblocks. Livestock consumables are materials suitable for consumption by a grazing animal.

A composition of the feedblock includes grains derived from wet cake. Another composition includes wet cake, syrup, and DDG. Hardeners, e.g., magnesium oxide, may be added to contribute to hardening of the feedblock mixture during the compression step. A preferred concentration range of magnesium oxide is from about 5% to about 12% by weight.

A preferred embodiment of the feedblock is made of wet cake, syrup, DDG, magnesium oxide, calcium carbonate, calcium sulfate, monocalcium phosphate, dicalcium phosphate, monosodium phosphate, salt, potassium chloride, potassium sulfate, magnesium sulfate, urea, zinc sulfate, iron sulfate, manganese sulfate, copper sulfate, cobalt sulfate, ethylenediamine dihydroiodide, sodium selenite, Vitamin A supplement, Vitamin D supplement, Vitamin E supplement, and mineral oil. This embodiment may be made to have the following properties: at least 12% crude protein (with no more than 5% crude protein from non-protein nitrogen sources); at least 2.5% crude fat, no more than 3.5% crude fiber; at least 1.7% calcium; no more than 2.2% calcium; at least 1.0% phosphorus; at least 5.0% NaCl salt; no more than 6.0% NaCl salt; at least 0.6% potassium; at least 7.0% magnesium; at least 6 ppm selenium; about 75,000 units Vitamin A per pound; about 10,000 units Vitamin D-3 per pound; about 100 units Vitamin E per pound.

To use this embodiment, the feedblocks are offered as free-choice to cattle in a pasture, grazing harvest aftermath, or in a dry lot with roughage and grain. About one 200 pound feedblock is offered for 25 cattle. Cattle typically consume about 1 pound per head daily under free-choice conditions, depending on the quality and quantity of roughage available. Clean fresh water should be accessible to the cattle. Cattle are preferably also offered loose salt-free choice in a separate feeder.

Another embodiment of the feedblock is made wet cake, DDG, syrup, monocalcium phosphate, dicalcium phosphate, calcium carbonate, magnesium oxide, potassium sulfate, manganese sulfate, salt, bentonite, Vitamin A acetate, Vitamin D-3 supplement, Vitamin E supplement, colbalt carbonate, copper sulfate, calcium iodate, ferrous carbonate, manganous oxide, sodium selenite, zinc oxide, and ammonium salt of proprionic acid (a preservative). This embodiment may be made to have the following properties: at least 12% crude protein; at least 4.0% crude fat, no more than 7.0% crude fiber; at least 1.8% calcium; no more than 2.4% calcium; at least 1.0% phosphorus; at least 4.5% NaCl salt; no more than 6.6% NaCl salt; at least 6.0% magnesium; at least 0.6% potassium; at least 216 ppm copper; at least 6 ppm selenium; at least 510 ppm zinc; at least about 75,000 international units Vitamin A per pound; at least about 10,000 international units Vitamin D-3 per pound; at least about 100 international units Vitamin E per pound.

Feedblocks are offered as free-choice to cattle on all types of roughages. About one 200 pound feedblock is offered for 20 cattle. Cattle typically should consume about 0.5 to 1 pounds per head daily. Clean fresh water and roughage should be accessible to the cattle. Cattle should be limited to consume less than 1.1 pounds per day so that the intake of selenium does not exceed 3 mg per head per day.

EXAMPLE 1

The materials listed in Table 1 were combined in a batch mixer operating at a mixing speed of 1200–1800 rpm for 30 to 45 minutes. The mixer was emptied onto a flat surface and the materials were manually moved into plastic 28 gallon tubs and then moved to a hydraulic press. The press was used to compress the materials in the tub with about 1000 to about 1500 psi applied for about 5–60 seconds. The moisture content at the time of fill was about 32%. Approximately 24 blocks were made with this process. The resultant blocks were immediately packaged and allowed to cure for at least two days. The feedblocks of Example 1 had about 12–15% crude protein, were about 200–210 pounds each and had a hardness suitable for choice feeding. The batch weighed about 2.5 tons.

TABLE 1

Materials used to make the feedblocks of Example 1

| Materials | Lbs/Ton | Lbs | % Concentration w/w |
|---|---|---|---|
| Syrup | 140 | 350 | 7.0 |
| DDG | 600 | 1500 | 30.0 |
| Wet Cake | 735 | 1837.5 | 36.7 |
| Tub Premix | 325 | 812.5 | 16.2 |
| Magnesium Oxide | 200 | 500 | 10.0 |
| Mold Inhibitor | 3 | 7.5 | 0.1 |
| TOTAL | | 5007.5 | 100 |

The syrup had a solids concentration of about 30%. The magnesium oxide was purchased from VIGORTONE, Inc. Moistures were measured according to standard laboratory practices known to those skilled in these arts. The DDG had a moisture content of about 10%–14%. The wet cake was derived from corn whole stillage and had a water content of about 66–70%. Tub premix contains ingredients as shown in Table 2 in amounts that produce approximately the concentration in the final product. Those skilled in these arts are able to assemble the components of the premix from the information in the Table 2.

TABLE 2

Ingredients in tub premix; percentages indicate approximate weight/weight (w/w) in final product

| Ingredient | Concentration in Feedblock |
|---|---|
| Calcium | 1.85–2.35% |
| Phosphorous | 1.0% |
| Magnesium | 6.0% |
| Potassium | 0.6% |
| Salt (NaCl) | 4.5–6.0% |

TABLE 2-continued

Ingredients in tub premix; percentages indicate approximate weight/weight (w/w) in final product

| Ingredient | Concentration in Feedblock |
| --- | --- |
| Copper | 215 ppm |
| Selenium | 6.0 ppm |
| Zinc | 510 ppm |
| Vitamin A | 75,000 IU per pound |
| Vitamin D3 | 10,000 IU per pound |
| Vitamin E | 100 IU per pound |

EXAMPLE 2

The materials and procedures of Example 1 were followed in this Example except that the materials were moved into the tubs using a conveyer and the materials were present in the amounts indicated in Table 3. The feedblocks of Example 2 had about 12–15% crude protein, were about 200 pounds each and had a hardness suitable for choice feeding. The batch was 3.5 tons and yielded 34 tubs with one feed block per tub.

TABLE 3

Materials used to make the feedblocks of Example 2

| Materials | Lbs/Ton | Lbs | % Concentration w/w |
| --- | --- | --- | --- |
| Syrup | 140 | 490 | 7.0 |
| DDG | 500 | 1750 | 25.0 |
| Wet Cake | 835 | 2922.5 | 41.7 |
| Tub Premix | 325 | 1135.5 | 16.2 |
| Magnesium Oxide | 200 | 700 | 10.0 |
| Mold Inhibitor | 3 | 10.5 | 0.1 |
| TOTAL | | 7008.5 | 100 |

EXAMPLE 3

Other combinations of materials were used to make feedblocks as set forth in Table 3. The procedures of Example 1 were followed. The feedblock compositions are shown in the percentage weight of the components plus the calculated and actual moisture content of the blocks. All of the blocks made in this Example had a texture and hardness that were sufficient for use as feedblocks. The batch size was about 2 tons and yielded 20 tubs with one feedblock per tub. The crude protein concentration was about 12%. This composition performed poorly since there was no mold inhibitor.

TABLE 4

Materials used to make feedblocks of Example 3

| Materials | Lbs/Ton | Lbs | % Concentration w/w |
| --- | --- | --- | --- |
| Syrup | 140 | 280 | 7.0 |
| DDG | 700 | 1400 | 35.0 |
| Wet Cake | 635 | 1270 | 31.8 |
| Tub Premix | 325 | 650 | 16.3 |
| Magnesium Oxide | 200 | 400 | 10.0 |
| TOTAL | | 4000 | 100 |

Although the present invention has been described with respect to the preferred embodiment, it will be understood that numerous changes and variations to aspects of the invention can be made and that the scope of the present invention is intended to be consistent with the claims as follows.

What is claimed is:

1. A process for making a livestock feed supplement, the process comprising compressing a mixture of materials that comprises wet cake into a feedblock that is consumable a livestock animal, wherein the mixture further comprises from about 5% to 10% by weight of syrup having from about 25% to about 35% solids.

2. The process of claim 1, wherein the feedblock has a weight of between about 100 and about 250 pounds.

3. The process of claim further comprising a step of adding a hardener before compressing the mixture.

4. The process of claim wherein the mixture comprises a grain-based solid and a grain-based soluble.

5. The process of claim 1, further comprising adding DDG to the mixture.

6. The process of claim 1, further comprising making the mixture with a water concentration from about 25% to about 40% by weight.

7. The process of claim 1, comprising curing a feedblock for at least one day alter the compression step.

8. The process of claim 1, comprising making the mixture with between about 30% to about 45% by weight of the wet cake, with the wet cake being from about 60% to about 75% water by weight.

9. A feedblock made by the process of claim 1.

10. A livestock animal feedblock comprising a mixture of materials formed into a solid block weighing from about 100 to about 250 pounds, that comprises a crude protein content of at least about 10%, and comprises from about 5% to about 10% by weight of a syrup having from about 25% to about 3% solids.

11. The animal feedblock of claim 10, wherein the mixture of materials further comprises from about 30% to about 45% by weight of wet cake having from about 60% to about 75% water by weight.

12. The animal feedblock of claim 11, wherein the mixture of materials further comprises about 15% to about 20% by weight of mineral supplements and from about 15% to 35% by weight of DDG having about 10% to about 15% water by weight.

13. A livestock animal feedblock comprising a mixture of materials formed into a solid block weighing from about 100 to about 250 pounds, that comprises a crude protein content of at least about 10%, and comprises from about 30% to about 45% by weight of wet cake having from about 60% to about 75% water by weight, wherein the mixture of materials further comprises from about 5% to about 10% by weight of a syrup having about 25% to 35% solids.

14. The animal feedblock of claim 13, wherein the mixture of materials further comprises about 15% to about 20% by weight of mineral supplements and from about 15% to 35% by weight of DDG having about 10% to about 15% water by weight.

* * * * *

UNITED STATES PATENT AND TRADEMARK OFFICE
CERTIFICATE OF CORRECTION

PATENT NO. : 6,793,947 B2
DATED : September 21, 2004
INVENTOR(S) : Gerald M. Bachmeier It is certified that error appears in the above-identified patent and that said Letters Patent is hereby corrected as shown below:

Column 8,
Line 9, after the word "consumable" please insert -- by --.
Lines 15 and 17, after the word "claim" please insert -- 1, --.

Signed and Sealed this

First Day of March, 2005

JON W. DUDAS
*Director of the United States Patent and Trademark Office*